United States Patent
Ponnuswamy et al.

(10) Patent No.: US 9,429,647 B2
(45) Date of Patent: Aug. 30, 2016

(54) CLASSIFYING WIRELESS SIGNALS

(71) Applicant: Aruba Networks, Inc., Sunnyvale, CA (US)

(72) Inventors: Subbu Ponnuswamy, Saratoga, CA (US); Nethra Muniyappa, San Jose, CA (US); Kiranmaye Sirigineni, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 122 days.

(21) Appl. No.: 14/097,188

(22) Filed: Dec. 4, 2013

(65) Prior Publication Data

US 2015/0156643 A1 Jun. 4, 2015

(51) Int. Cl.
| | |
|---|---|
| *H04L 5/14* | (2006.01) |
| *H04L 12/28* | (2006.01) |
| *H04J 3/00* | (2006.01) |
| *G01S 13/00* | (2006.01) |
| *H04L 27/26* | (2006.01) |

(52) U.S. Cl.
CPC .............. *G01S 13/00* (2013.01); *H04L 27/265* (2013.01)

(58) Field of Classification Search
CPC ....... H04L 27/265; H04L 5/007; H04J 27/06
See application file for complete search history.

(56) References Cited

U.S. PATENT DOCUMENTS

| | | | | | |
|---|---|---|---|---|---|
| 6,130,907 | A * | 10/2000 | Chen | ...................... | H04B 1/707 324/76.19 |
| 6,275,543 | B1 * | 8/2001 | Petrus | .................. | H04B 7/0851 343/893 |
| 2008/0307025 | A1 * | 12/2008 | Licul | ..................... | G01S 5/0215 708/308 |
| 2011/0242984 | A1 * | 10/2011 | Ponnuswamy | ......... | H04L 41/22 370/241 |
| 2012/0089396 | A1 * | 4/2012 | Patel | ...................... | G10L 25/00 704/249 |
| 2012/0264446 | A1 * | 10/2012 | Xie | ......................... | G01C 22/00 455/456.1 |
| 2013/0242762 | A1 * | 9/2013 | Bennett | ............. | H04W 72/0486 370/252 |
| 2014/0079248 | A1 * | 3/2014 | Short | .................. | G10L 21/0272 381/119 |
| 2015/0156693 | A1 * | 6/2015 | Tabet | .................... | H04W 36/30 455/437 |

* cited by examiner

*Primary Examiner* — Brian Roberts
*Assistant Examiner* — Abu-Sayeed Haque
(74) *Attorney, Agent, or Firm* — Mannava & Kang, P.C.

(57) ABSTRACT

The present disclosure discloses a system and method for classifying Wi-Fi signals from Fourier transform samples. Generally, classifying Wi-Fi signals from Fourier transform samples includes: collecting and dividing Fourier transform samples into frequency blocks; determining the bandwidth for the Fourier transform sample; and determining whether the Fourier transform sample corresponds to a narrowband signal. Further, if a determination is made that the Fourier transform sample does not correspond to a narrowband signal, channel utilization is calculated based on a determination that the FFT sample corresponds to a Wi-Fi signal. If it is determined that the Fourier transform sample corresponds to a narrowband signal, then a determination is made that the FFT sample corresponds to a Wi-Fi signal based on certain criteria. The certain criteria may include one or more of a slope value, a number of sub-peak bins, an analysis of adjacent channels, characteristic matching, or other criteria.

17 Claims, 13 Drawing Sheets

CLASSIFYING WIRELESS SIGNALS

FIELD

The present disclosure relates to detecting and classifying Wi-Fi signatures from Fourier Transform samples, e.g., Fast Fourier Transform (FFT) samples. In particular, the present disclosure relates to classifying Wi-Fi signals from Fourier transform samples to minimize false detections.

BACKGROUND

Wireless digital networks provide users secure and cost-effective access to resources. Such wireless digital networks typically have a plurality of access points (AP) located throughout a designated area, by which the users can access the resources they desire. Wi-Fi networks operating in accordance with IEEE 802.11 standards are examples of such networks. The frequencies used by these networks are shared. They are shared not only among the wireless digital networks themselves, but also with other non-network devices. These shared frequencies face intermittent and continuous interference received from other non-network devices, including radio-frequency devices, such as microwave ovens, wireless video streaming devices, cordless telephones, and the like, as well as other adjacent wireless networking devices. Unfortunately, the effects of these types of interfering devices can vary. As an example, simply replacing or adding a microwave oven in a particular area where a particular wireless digital network is operating can dramatically alter the interference levels present within that particular wireless digital network.

To identify the sources of interference that obstruct operation of a wireless digital network, various types of test equipment and functionalities are used, for example, spectrum analyzers. Although sophisticated spectrum analyzers exist, which include receivers that may be calibrated to display and measure signals over a wide range of frequencies and amplitudes, such sophisticated devices are costly and often not used for continuous monitoring and management of wireless digital networks. Wireless digital networks contain access points (AP) and wireless client devices, both examples of narrowband network (radio) devices with spectrum data collection functionality.

A radio has the capability to receive Wi-Fi packets as well as non-Wi-Fi interference, which is received as Fourier transform samples. Not all Wi-Fi is received as Wi-Fi signals and not all non-Wi-Fi are received as Fourier transform samples. False detection may happen, for example, Wi-Fi packets may be received as FFT samples. Often, a majority of false detections of interferers are caused by the existence of Wi-Fi frames on the air that the radio cannot decode. For example, an 11n radio will not be able to decode wireless frames in compliance with IEEE 802.11ac standard and a 20 MHz radio will not be able to decode 40 MHz frames. Similarly, a radio that does not support optional formats such as STBC, LDPC, and Greenfield will not be able to decode these frames. In addition, frames on adjacent channels may also simply appear as "energy" on the channel. Since Wi-Fi frames may have large enough duration and the fixed FFT signature, these are highly likely to be classified as a fixed frequency or a frequency hopping interferer. Therefore, methods are required to filter out the FFTs that are generated by Wi-Fi frames in order to minimize false detections. In addition, the accurate classification of FFT signatures (non-Wi-Fi interferer vs. Wi-Fi) will also improve the accuracy of the channel utilization or duty cycle calculations.

Therefore, it is desirable to have enhanced ways for accurately classifying interferers as well as minimize the number of false detections.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
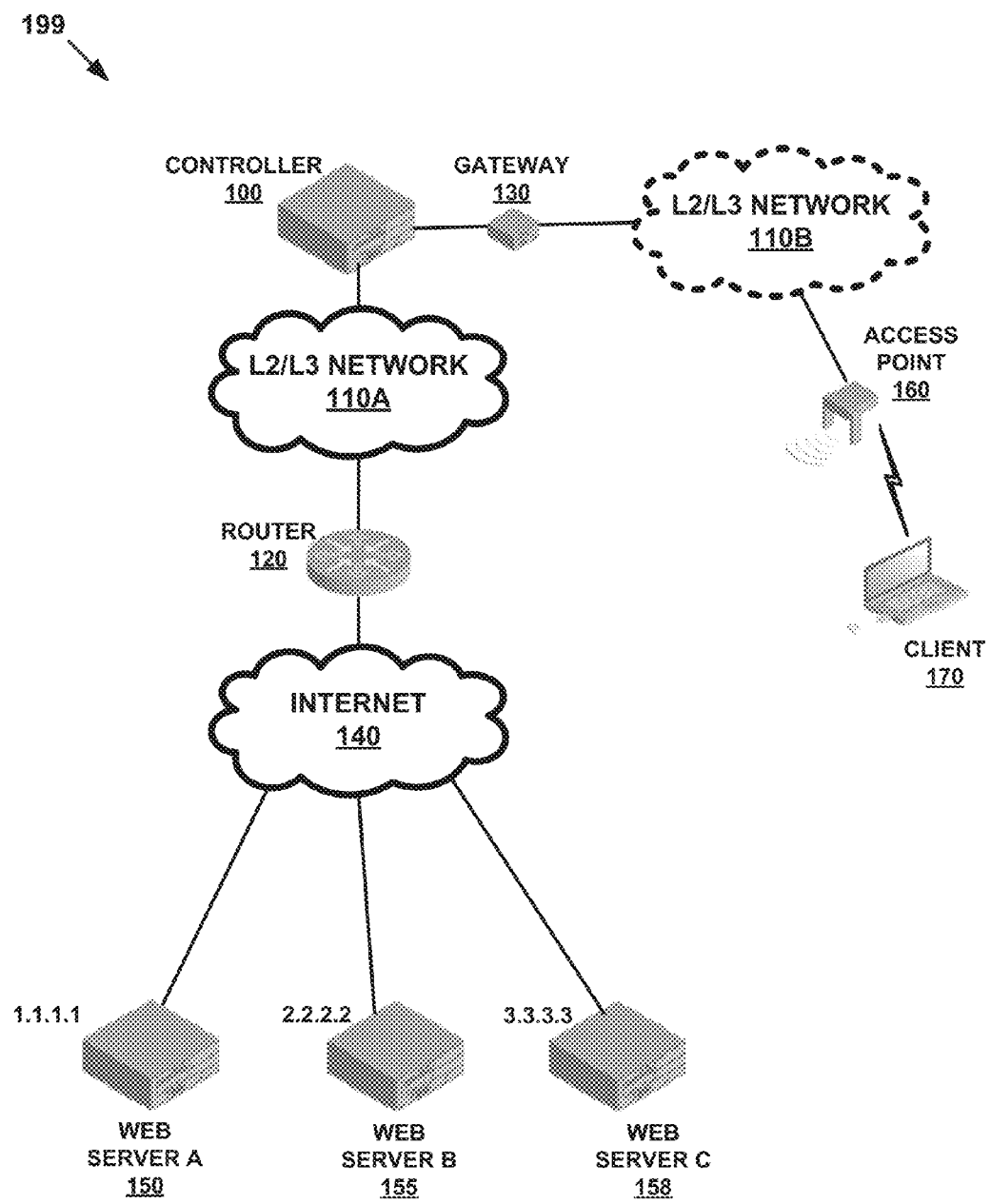
FIG. 1 is a block diagram illustrating an example network environment according to embodiments of the present disclosure.

In the following description, several specific details are presented to provide a thorough understanding. While the context of the disclosure is directed to task processing and resource sharing in a distributed wireless system, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Some embodiments of the present disclosure relates to classifying Wi-Fi signals from Fourier transform samples. Generally, classifying Wi-Fi signals from Fourier transform samples includes: collecting and dividing Fourier transform samples into frequency blocks; determining the bandwidth for the Fourier transform sample; and determining whether the Fourier transform sample corresponds to a narrowband signal. Further, if a determination is made that the Fourier transform sample does not correspond to a narrowband signal, channel utilization is calculated based on a determination that the FFT sample corresponds to a Wi-Fi signal. If it is determined that the Fourier transform sample corresponds to a narrowband signal, then a determination is made that the FFT sample corresponds to a Wi-Fi signal based on certain criteria. The certain criteria may include one or more of a slope value, a number of sub-peak bins, an analysis of adjacent channels, characteristic matching, or other criteria.

In some embodiments, classifying Wi-Fi signals from Fourier transform samples is based on slope values. In such embodiments, the detecting and classifying includes: determining, for each of a plurality of frequency bins in a Fourier Transform sample a corresponding signal strength, the Fourier Transform sample corresponding to a wireless signal as detected at a first time period; identifying a first frequency bin, from the plurality of frequency bins, with a first signal strength, the first signal strength being a highest signal strength in the signal strengths corresponding to each of the plurality of frequency bins; determining a decrease in signal strength between (a) the first signal strength corresponding to the first bin and (b) a second signal strength corresponding to a second bin in the plurality of bins; and based at least on the decrease in signal strength and a frequency difference between the first bin and the second bin, classifying the Fourier Transform sample.

In some embodiments, classifying Wi-Fi signals from Fourier transform samples is based on a number of sub-peak bins. In such embodiments, the classifying includes: determining, for each of a plurality of frequency bins in a Fourier Transform sample a corresponding signal strength, the Fourier Transform sample corresponding to a wireless signal as detected at a first time period; identifying a first frequency bin, from the plurality of frequency bins, with a first signal strength, the first signal strength being a highest signal strength in the signal strengths corresponding to each of the plurality of frequency bins; identifying a subset of the plurality of frequency bins, each particular bin in the subset of frequency bins corresponding to signal strengths that is (a) lower than the first signal strength, (b) higher than at least the signal strength for n consecutive frequency bins in the plurality of frequency bins preceding the particular bin, and (c) higher than at least the signal strength for m consecutive frequency bins in the plurality of frequency bins subsequent to the particular bin; and based on a number of frequency bins in the subset of frequency bins, classifying the Fourier Transform sample. In some embodiments, the sub-peak frequency bin is any frequency bin corresponding to a signal strengths that is (a) lower than the first signal strength, (b) higher than at least the signal strength for n consecutive frequency bins in the plurality of frequency bins preceding the particular bin, and (c) higher than at least the signal strength for m consecutive frequency bins in the plurality of frequency bins subsequent to the particular bin. The detecting and classifying further includes determining a signal type for the signal based at least on the number of sub-peak frequency bins within the particular number of frequency bins from the peak frequency bin.

In some embodiments, classifying Wi-Fi signals from Fourier transform samples is based on analysis of adjacent channels. In such embodiments, the classifying includes: detecting a plurality of wireless signals on a corresponding plurality of frequency channels; classifying each of the plurality of wireless signals as Wi-Fi signals or non-Wi-Fi signals; and analyzing information for the wireless signals from the plurality of wireless signals that were classified as Wi-Fi signals to identify at least two of the wireless signals detected on two corresponding channels as a portion of a same Wi-Fi transmission from a same source device. In some embodiments, the wireless signal is near an edge of the second radio frequency channel shared with the first radio frequency channel.

Computing Environment

FIG. 1 shows an example digital network environment 199 according to embodiments of the present disclosure. FIG. 1 includes at least one or more network controller (such as controller 100), one or more access points (such as access point 160), one or more client devices (such as client 170), a layer 2 or layer 3 network 110, a routing device (such as router 120), a gateway 130, Internet 140, and one or more web servers (such as web server A 150, web server B 155, and web server C 158), etc. The components of the digital network environment 199 are communicatively coupled to each other. In some embodiments, the digital network environment 199 may include other components not shown in FIG. 1 such as an email server, a cloud-based storage device, etc. It is intended that any of the servers shown may represent an email server instead as illustrated with email functionalities and any of the network devices may serve as a cloud-based storage device. The network 140 may be implemented within a cloud environment.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc. In some embodiments, the controller 100 is an optional component in the digital network environment 199.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170 is associated with the access point 160 via a wireless link. An access point 160 generally refers to a network device that allows wireless clients to connect to a wired network. Access points 160 usually connect to a controller 100 via a wired network or can be a part of a controller 100 in itself. For example, the access point 160 is connected to the controller 100 via an optional L2/L3 network 110B.

Wired interfaces typically include IEEE 802.3 Ethernet interfaces, used for wired connections to other network devices such as switches, or to a controller. Wireless interfaces may be WiMAX, 3G, 4G, and/or IEEE 802.11 wireless interfaces. In some embodiments, controllers and APs may operate under control of operating systems, with purpose-built programs providing host controller and access point functionality.

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100. In some embodiments, the gateway 130 is an optional component in the digital network environment 199.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook.com).

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is illustrated in FIG. 1, a plurality of clients 170 can be included in FIG. 1.

Network Device for Wi-Fi Signature Detection Application

Figure 2:
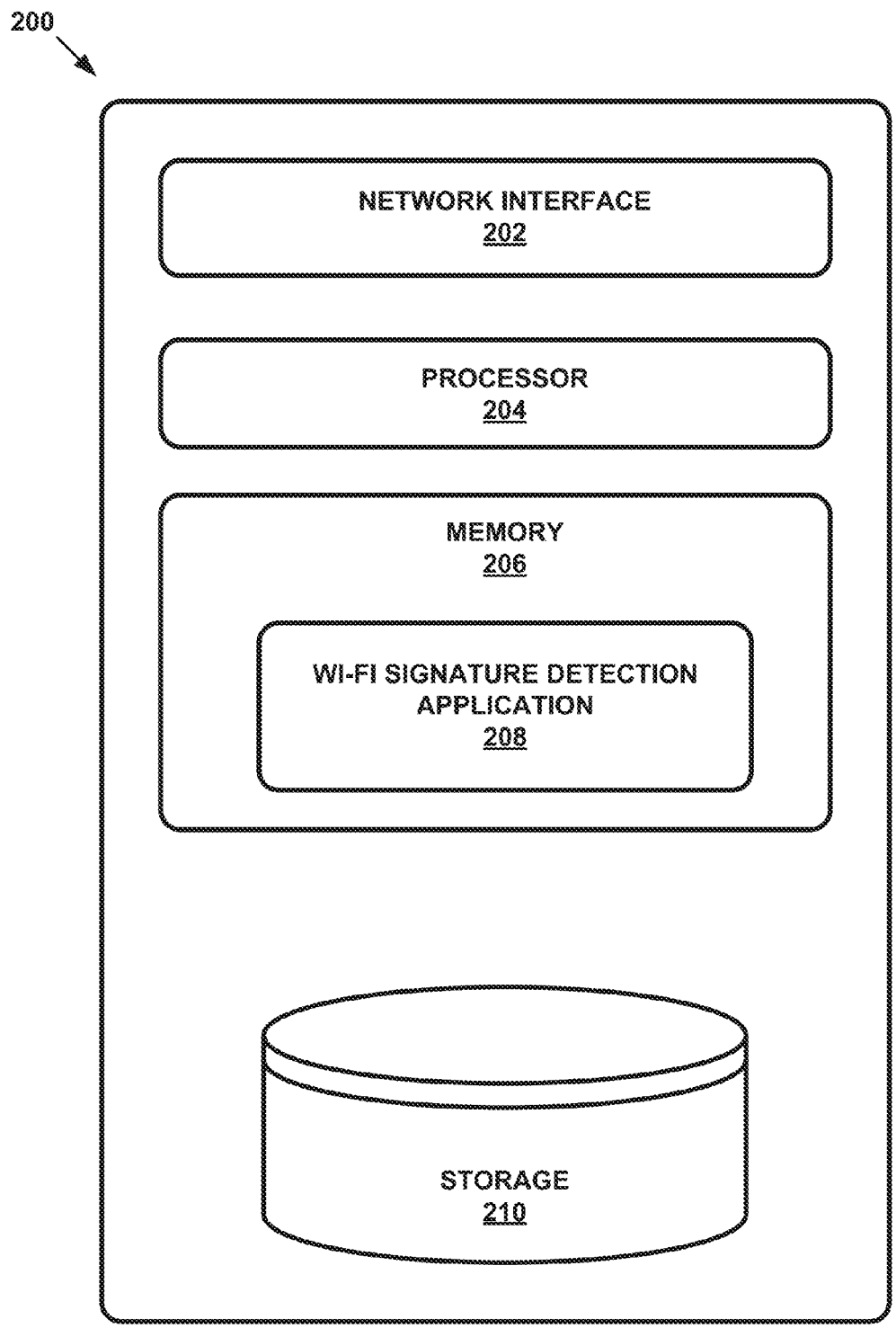
FIG. 2 is a block diagram illustrating an example network device according to embodiments of the present disclosure.

FIG. 2 is a block diagram illustrating an example network device system 200 for detecting Wi-Fi signatures according to embodiments of the present disclosure. The network device 200 may be used as a network switch, a network router, a network controller, a network server, an access point, etc. Further, the network device 200 may serve as a node in a distributed or a cloud computing environment.

According to embodiments of the present disclosure, network services provided by the network device 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. In some embodiments, the network device or system 200 may serve as a node in a distributed or a cloud computing environment.

In some embodiments, the network device 200 includes a network interface 202 capable of communicating to a wired network, a processor 204, a memory 206 and a storage device 210. The components of the network device 200 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device 200.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores a Wi-Fi signature detection application 208. The Wi-Fi signature detection application 208 can be the code and routines that, when executed by processor 204, cause the network device 200 to implement detecting and classifying Wi-Fi signatures from FFT samples. In some embodiments, a node can be an access point 160. In some other embodiments, a node can be a controller 100, a router 120, a gateway 130, a switch or any other network device. In some embodiments, the Wi-Fi signature detection application 208 can be located in an access point 160. In some other embodiments, the Wi-Fi signature detection application 208 can be located in a controller 100, a router 120, a gateway 130, a switch or any other network device. In some embodiments, the Wi-Fi signature detection application 208 can be implemented using hardware including a Field-Programmable Gate Array (FPGA) or an Application-Specific Integrated Circuit (ASIC). In some other embodiments, the Wi-Fi signature detection application 208 can be implemented using a combination of hardware and software. In some embodiments, the Wi-Fi signature detection application 208 may be stored in a combination of the network devices, or in one of the network devices. The Wi-Fi signature detection application 208 is described below in more detail with reference to FIGS. 3-11.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Wi-Fi Signature Detection Application

Figure 3:
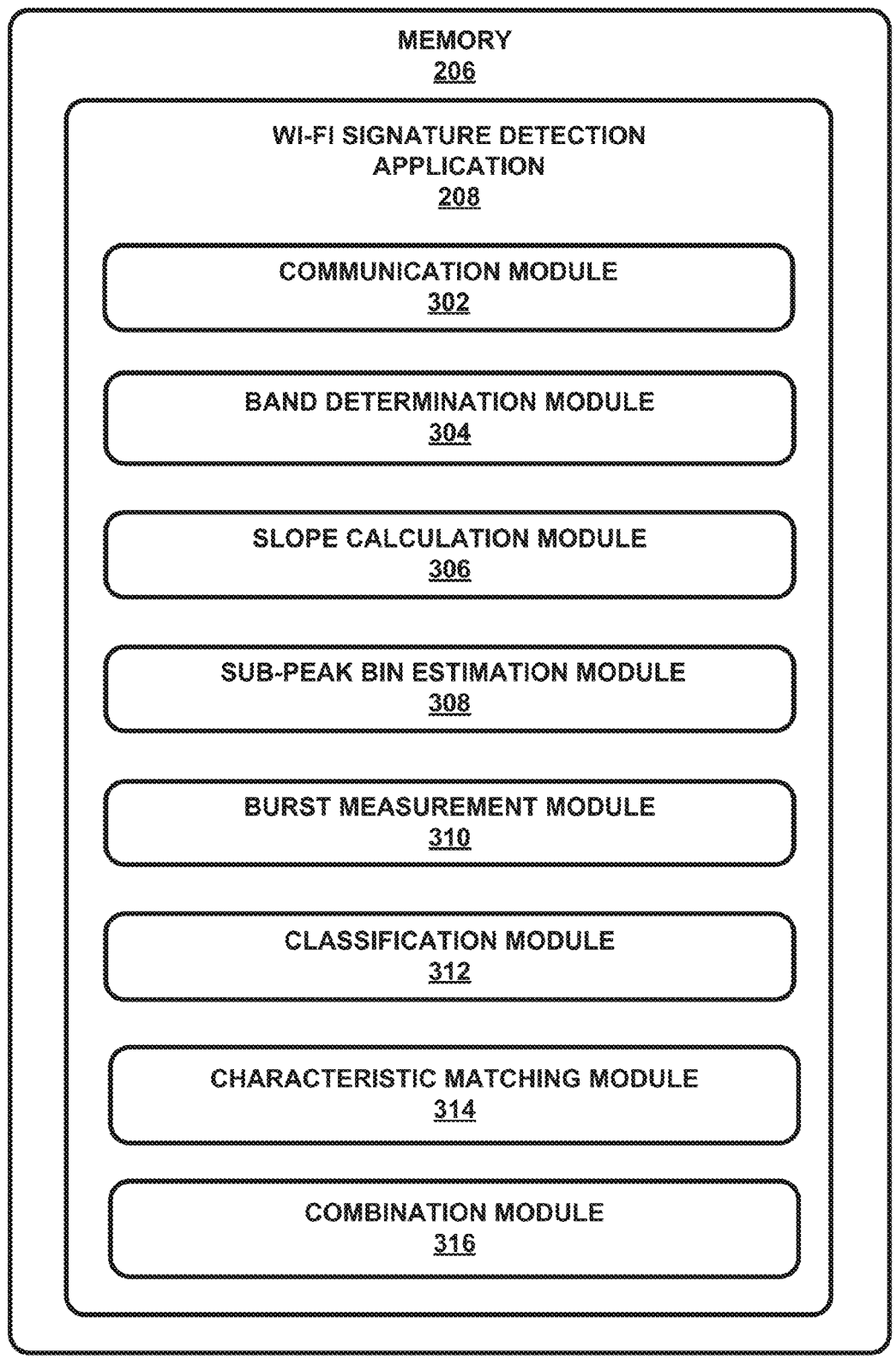
FIG. 3 is a block diagram illustrating an example Wi-Fi signature detection application according to some embodiments of the present disclosure. The application is stored on a memory of the example network device or system.

FIG. 3 illustrates an example Wi-Fi signature detection application 208 stored on a memory 206 according to embodiments of the present disclosure. In some embodiments, the Wi-Fi signature detection application 208 includes a communication module 302, a band determination module 304, a slope calculation module 306, a sub-peak bin estimation module 308, a burst measurement module 310, a classification module 312, a characteristic matching module 314, and a combination module 316.

The Wi-Fi signature detection application 208 can be software including routines for detecting and classifying Wi-Fi signals from Fourier transform samples based on certain criteria. In some embodiments, the Wi-Fi signature detection application 208 can be a set of instructions executable by the processor 204 to provide the functionality described herein. In some other embodiments, the Wi-Fi signature detection application 208 can be stored in the memory 206 and can be accessible and executable by the processor 204.

A Fourier transform converts time (or space) to frequency and vice versa. A Fast Fourier Transform, or FFT, is a kind of Fourier transform method for computing the frequency spectrum of a time-varying input signal. This line chart shows the power level of a signal on the channels or frequencies monitored by a spectrum monitor radio. Table 1 below illustrates an example FFT signal strength levels corresponding to different frequency bins.

TABLE 1

| Frequency Bin No. | Signal Strength |
|---|---|
| 0 | −95 dBm |
| 1 | −90 dBm |
| 2 | −80 dBm |
| 3 | −72 dBm |
| 4 | −75 dBm |
| 5 | −70 dBm |
| 6 | −65 dBm |
| 7 | −50 dBm |
| 8 | −70 dBm |
| 9 | −75 dBm |
| 10 | −80 dBm |
| 11 | −65 dBm |
| 12 | −75 dBm |
| 13 | −80 dBm |
| 14 | −90 dBm |
| 15 | −95 dBm |

The Wi-Fi signature detection application 208 determines whether a Fourier transform sample corresponds to a Wi-Fi signal based on certain criteria. In some embodiments, the Wi-Fi signature detection application 208 collects and divides Fourier transform samples, such as FFT samples, into frequency block and determines the bandwidth for the FFT sample. If the Wi-Fi signature detection application 208 determines that the sample does not correspond to a narrowband signal, then it calculates channel utilization based on a determination that the FFT sample corresponds to a Wi-Fi signal. If the Wi-Fi signature detection application 208 determines that the FFT sample corresponds to a narrowband signal, then it determines that the FFT sample corresponds to a Wi-Fi signal based on certain criteria.

Various modules included in the Wi-Fi signature detection application 208 determines that the FFT sample corresponds to a Wi-Fi signal based on various criteria. Examples of these various criteria are described in the descriptions of the slope calculation module 306, the sub-peak estimation module 308, the classification module 312, the characteristic matching module 314 and the combination module 316.

The communication module 302 can be software including routines for handling communications between the Wi-Fi signature detection application 208 and other components in the digital computing environment 199 (FIG. 1). In some embodiments, the communication module 302 can be a set of instructions executable by the processor 204 to provide the functionality described herein. In some other embodiments, the communication module 302 can be stored in the memory 206 of the Wi-Fi signature detection application 208 and can be accessible and executable by the processor 204.

In some embodiments, the communication module 302 may be adapted for cooperation and communication with the processor 204 and other components of the Wi-Fi signature detection application 208 such as the network interface 202, the storage 210, etc.

In some embodiments, the communication module 302 sends and receives data to and from one or more of a client 170 (FIG. 1), an access point 160 (FIG. 1) and other network devices via the network interface 202 (FIG. 2), in the event of distributed functionalities. In some embodiments, the communication module 302 handles communications between components of the Wi-Fi signature detection application 208. In some embodiments, the communication module 302 receives data from other components of the Wi-Fi signature detection application 208 and stores the data in the storage device 210.

The band determination module 304 can be software including routines for determining whether an FFT sample corresponds to a Wi-Fi signal based on certain criteria.

In some embodiments, the band determination module 304 can be a set of instructions executable by the processor 204 to provide the functionality described herein. In some other embodiments, the band determination module 304 can be stored in the memory 206 of the Wi-Fi signature detection application 208 and can be accessible and executable by the processor 204.

In some embodiments, the band determination module 304 collects and divides FFT samples into frequency block and determines the bandwidth for the FFT sample.

The slope calculation module 306 can be software including routines for determining whether the FFT sample corresponds to a Wi-Fi signal based at least on the slope values. In some embodiments, the slope calculation module 306 can be a set of instructions executable by the processor 204 to provide the functionality described herein. In some other embodiments, the slope calculation module 306 can be stored in the memory 206 of the Wi-Fi signature detection application 208 and can be accessible and executable by the processor 204.

In some embodiments, slope calculation module 306 determines whether the Fourier transform sample corresponds to a Wi-Fi signal based on the slope values. The slope calculation module 306 identifies a peak frequency bin for an FFT sample from a plurality of frequency bins corresponding to signal strength for a signal detected on a channel at a particular time. In some embodiments, the peak frequency bin corresponds to a peak in signal strength. For instance, in the example illustrated in Table 2, the peak frequency bin is frequency bin No. 7, which corresponds to a signal strength level of −50 dBm. The slope calculation module 306 then determines a decrease in signal strength between (a) the first signal strength corresponding to the first bin and (b) a second signal strength corresponding to a second bin in the plurality of bins.

Specifically, in some embodiments, the slope calculation module 306 can compute a set of slope values between the signal strength corresponding to the peak frequency bin and the signal strength for each of a plurality of frequency bins within a certain range from the peak frequency bin. For example, in the example illustrated in Table 2, the slope calculation module 306 may calculate a slope value based on signal strength levels corresponding to each of (i) bins 7 and 8, (ii) bins 7 and 9, (iii) bins 7 and 10, (iv) bins 7 and 11, (v) bins 7 and 12, etc. Accordingly, the resulting slope values are: (i) 20, (ii) 25, (iii) 30, (iv) 15, (v) 25, etc. The slope calculation module 306 then compares each of the slope values to a corresponding threshold value that is dependent on the number of the frequency bins between the peak frequency bin and the frequency bin corresponding to that slope. For example, the set of threshold values corresponding to (i) bins 7 and 8, (ii) bins 7 and 9, (iii) bins 7 and 10, (iv) bins 7 and 11, (v) bins 7 and 12, may be (i) 40, (ii) 35, (iii) 30, (iv) 25, (v) 20, etc. The slope calculation module 306 then determines a number of satisfying slope values from the set of slope values. In some embodiments, the satisfying slope values meet their corresponding thresholds, for example, the slope values corresponding to (iii) bins 7 and 10 (i.e., a slope value of 30), and (v) bins 7 and 12 (i.e., a slope value of 25) meet their corresponding threshold values (i.e., 30 for bins 7 and 10, and 20 for bins 7 and 12). Finally, the slope calculation module 306 determines whether the FFT sample corresponds to a Wi-Fi signal based at least on the number of satisfying slope values. Here, for example, because only 2 out of 5 slope values meet the threshold, the slope calculation module 306 may determine that the FFT sample does not correspond to a Wi-Fi signal, but rather a narrow band interference signal.

In some embodiments, the slope calculation module 306 also determines a burst duration for the signal. In such embodiments, determining whether the FFT sample corresponds to a Wi-Fi signal may also be based on the burst duration exceeding a predetermined threshold value.

In some embodiments, the slope calculation module 306 also computes an average slope value of the slope values corresponding to the frequency bins preceding the peak frequency bin. In such embodiments, determining whether the FFT sample corresponds to a Wi-Fi signal is also based on the average slope value. For example, in Table 1, the average slope value of the slope values corresponding to frequency bins 1 to 6 that are preceding the peak frequency bin 7 is (30+28+25+20+15)/5=23.6.

In some embodiments, the slope calculation module 306 also computes an average slope value of the slope values corresponding to the frequency bins subsequent to the peak frequency bin. In such embodiments, determining whether the FFT sample corresponds to a Wi-Fi signal is also based on the average slope value. For example, in Table 1, the average slope value of the slope values corresponding to frequency bins 8 to 12 that are subsequent to the peak frequency bin 7 is (20+25+30+15+25)/5=23.

In some embodiments, the slope calculation module 306 also computes a first average slope value of the slope values corresponding to the frequency bins preceding the peak frequency bin. The slope calculation module 306 further computes a second average slope value of the slope values corresponding to the frequency bins subsequent to the peak frequency bin, and computes a third average slope value based on the first average slope value and the second average slope value. In such embodiments, determining whether the FFT sample corresponds to a Wi-Fi signal is also based on the third average slope value, for example, (23.6+23)/2=23.3.

The sub-peak bin estimation module 308 can be software including routines for determining a signal type for the signal based on the number of sub-peak frequency bins within the particular number of frequency bins from the peak frequency bin. In some embodiments, the sub-peak bin estimation module 308 can be a set of instructions executable by the processor 204 to provide the functionality described herein. In some other embodiments, the sub-peak bin estimation module 308 can be stored in the memory 206 of the Wi-Fi signature detection application 208 and can be accessible and executable by the processor 204.

In some embodiments, the sub-peak bin estimation module 308 determines a signal type for the signal based on the number of sub-peak frequency bins within the particular number of frequency bins from the peak frequency bin. In some embodiments, the sub-peak bin estimation module 308 identifies a peak frequency bin from a plurality of frequency bins for an FFT sample corresponding to signal strength for a signal detected within a frequency channel at a particular time. In some embodiments, the peak frequency bin corresponds to a peak in the signal strength for the signal. The sub-peak bin estimation module 308 then determines a number of sub-peak frequency bins within a particular number of frequency bins from the peak frequency bin.

In some embodiments, the sub-peak frequency bin is any frequency bin corresponding to a signal strength that is (a) lower than the peak signal strength, (b) higher than at least the signal strength for n consecutive frequency bins in the plurality of frequency bins preceding the particular bin, and (c) higher than at least the signal strength for m consecutive frequency bins in the plurality of frequency bins subsequent to the particular bin. In the example illustrated in Table 1, frequency bin 11 corresponds to a sub-peak because the signal strength level −65 dBm is (a) lower than the peak signal strength −50 dBm, (b) higher than at least 3 consecutive frequency bins in the plurality of frequency bins preceding the particular bin, and (c) higher than at least the signal strength for 3 consecutive frequency bins in the plurality of frequency bins subsequent to the particular bin.

Finally, the sub-peak bin estimation module 308 determines a signal type for the signal based at least on the number of sub-peak frequency bins within the particular number of frequency bins from the peak frequency bin. For example, the FFT sample illustrated in Table 1 may be classified as a non-Wi-Fi signal because there is only 1 sub-peak frequency bin. On the other hand, according to some embodiments, if at least two sub-peak bins are identified preceding the peak bin and at least two sub-peak bins are identified subsequent to the peak bin, the corresponding FFT sample will be classified as a Wi-Fi signal.

In some embodiments, the sub-peak bin estimation module 308 also determines a burst duration for the signal. In such embodiments, determining the signal type for the signal is also based on the burst duration. In some embodiments, the signal type includes Wi-Fi signals as well as non-Wi-Fi signals.

In some embodiments, determining the number of sub-peak frequency bins also includes: identifying a plurality of first frequency bins within the particular number of frequency bins from the peak frequency bin; determining a rate of change between the signal strength corresponding to one of the plurality of first frequency bins and the signal strength corresponding to each of the n frequency bins immediately preceding the one of the first frequency bins; determining whether the rate of change is positive; and determining that the one of the first frequency bins is a sub-peak bin in response to determining that the rate of change is positive.

In other embodiments, determining the number of sub-peak frequency bins also includes: identifying a plurality of first frequency bins within the particular number of frequency bins from the peak frequency bin; determining a number of rates of change between the signal strength corresponding to each of the plurality of first frequency bins and the signal strength corresponding to the peak frequency bin; determining a satisfying rate of change from the number of rates of change; the satisfying rate of change being less than any rates of change in the number of rages of change computed between at least one first frequency bin and the peak frequency bin, wherein the at least one first frequency bin is between the first frequency bin corresponding to the satisfying rate of change and the peak bin; and determining that the first frequency bin corresponding to the satisfying rate of change is a sub-peak frequency bin.

The burst measurement module 310 can be software including routines for estimating a duration of the wireless signal burst that is longer than a first time period. In some embodiments, the burst measurement module 310 can be a set of instructions executable by the processor 204 to provide the functionality described herein. In some other embodiments, the burst measurement module 310 can be stored in the memory 206 of the Wi-Fi signature detection application 208 and can be accessible and executable by the processor 204.

In some embodiments, the burst measurement module 310 estimates a duration of the wireless signal burst. In some embodiments, the burst measurement module 310 first obtains a first plurality of samples corresponding to a first set of wireless signals received in a first time period from a first source. In some embodiments, the first set of wireless signals corresponds to a portion of a wireless signal burst from the first source. In some embodiments, the burst measurement module 310 then obtains a second plurality of samples corresponding to a second set of wireless signals received in a second time period from a second source. Responsive to determining that the second set of wireless signals has a higher signal strength than the first set of wireless signals, the burst measurement module 310 then determines that the first set of wireless signals corresponding to a portion of a wireless signal burst from the first source. Finally, the burst measurement module 310 then estimates a duration of the wireless signal burst that is longer than the first time period.

In some embodiments, determining that the second set of wireless signals has a higher signal strength than the first set of wireless signals includes: computing a first average signal strength for the first set of wireless signals; computing a second average signal strength for the second set of wireless signals; and comparing the first average signal strength and the second average signal strength.

The classification module 312 can be software including routines for classifying Wi-Fi signals. In some embodiments, the classification module 312 can be a set of instructions executable by the processor 204 to provide the functionality described herein. In some other embodiments, the classification module 312 can be stored in the memory 206 of the Wi-Fi signature detection application 208 and can be accessible and executable by the processor 204.

In some embodiments, the classification module 312 determines that an FFT sample corresponds to a Wi-Fi signal based on analysis of an adjacent channel. In some embodiments, the classification module 312 determines a usage of a first radio frequency channel related to Wi-Fi wireless signals. In some embodiments, the classification module 312 then detects a wireless signal on a second radio frequency channel adjacent to the first radio frequency channel. In some embodiments, the wireless signal is near an edge of the second radio frequency channel shared with the first radio frequency channel. In some embodiments, the classification module 312 then determines that wireless signal detected on the second radio frequency channel corresponds to Wi-Fi wireless signals based at least on the usage of the first radio frequency channel related to Wi-Fi wireless signals.

In some embodiments, determining that wireless signal detected on the second radio frequency channel corresponds to Wi-Fi wireless signals includes: determining whether the usage of the first radio frequency channel exceeds a particular threshold and determining that wireless signal detected on the second radio frequency channel corresponds to Wi-Fi wireless signals in response to determining that the usage of the first radio frequency channel exceeds a particular threshold.

The characteristic matching module 314 can be software including routines for classifying Wi-Fi signals based on characteristic matching. In some embodiments, the characteristic matching module 314 can be a set of instructions executable by the processor 204 to provide the functionality described herein. In some other embodiments, the characteristic matching module 314 can be stored in the memory 206 of the Wi-Fi signature detection application 208 and can be accessible and executable by the processor 204.

In some embodiments, the characteristic matching module 314 determines that the FFT sample corresponds to a Wi-Fi signal based characteristic matching. In some embodiments, the characteristic matching module 314 detects a first wireless signal. In some embodiments, the characteristic matching module 314 then determines that at least a portion of the characteristics associated with the first wireless signal matches that of a second wireless signal that was previously classified as a Wi-Fi signal. Finally, the characteristic matching module 314 classifies the first wireless signal as a Wi-Fi signal based at least on the determination that at least a portion of the characteristics associated with the first wireless signal matches the second wireless signal.

In some embodiments, the portion of characteristics that matches that of the second wireless signal includes a frequency bin in which a peak signal strength was detected. In some embodiments, the portion of characteristics that matches that of the second wireless signal includes a highest signal strength. In some embodiments, the portion of characteristics that matches that of the second wireless signal includes a frequency bin in which a peak signal strength was detected and a highest signal strength.

The combination module 316 can be software including routines for classifying Wi-Fi signals. In some embodiments, the combination module 316 can be a set of instructions executable by the processor 204 to provide the functionality described herein. In some other embodiments, the combination module 316 can be stored in the memory 206 of the Wi-Fi signature detection application 208 and can be accessible and executable by the processor 204.

In some embodiments, the combination module 316 detects a first wireless signal corresponding to a frequency band. In some embodiments, the combination module 316 then identifies different subsections of the frequency band and corresponding component wireless signals in the different subsections. In some embodiments, the component wireless signals form the first wireless signal. In some embodiments, the combination module 316 then selects a plurality of combinations of component wireless signals using the different subsections and classifies the plurality of combinations of component wireless signals as Wi-Fi signals or non-Wi-Fi signals. Finally, the combination module 316 determines that the first wireless signal is non-Wi-Fi in response to determining that none of the plurality of combinations of component wireless signals has been classified as Wi-Fi.

Processes for Detecting Wi-Fi Signatures from FFT Samples

Figure 4:
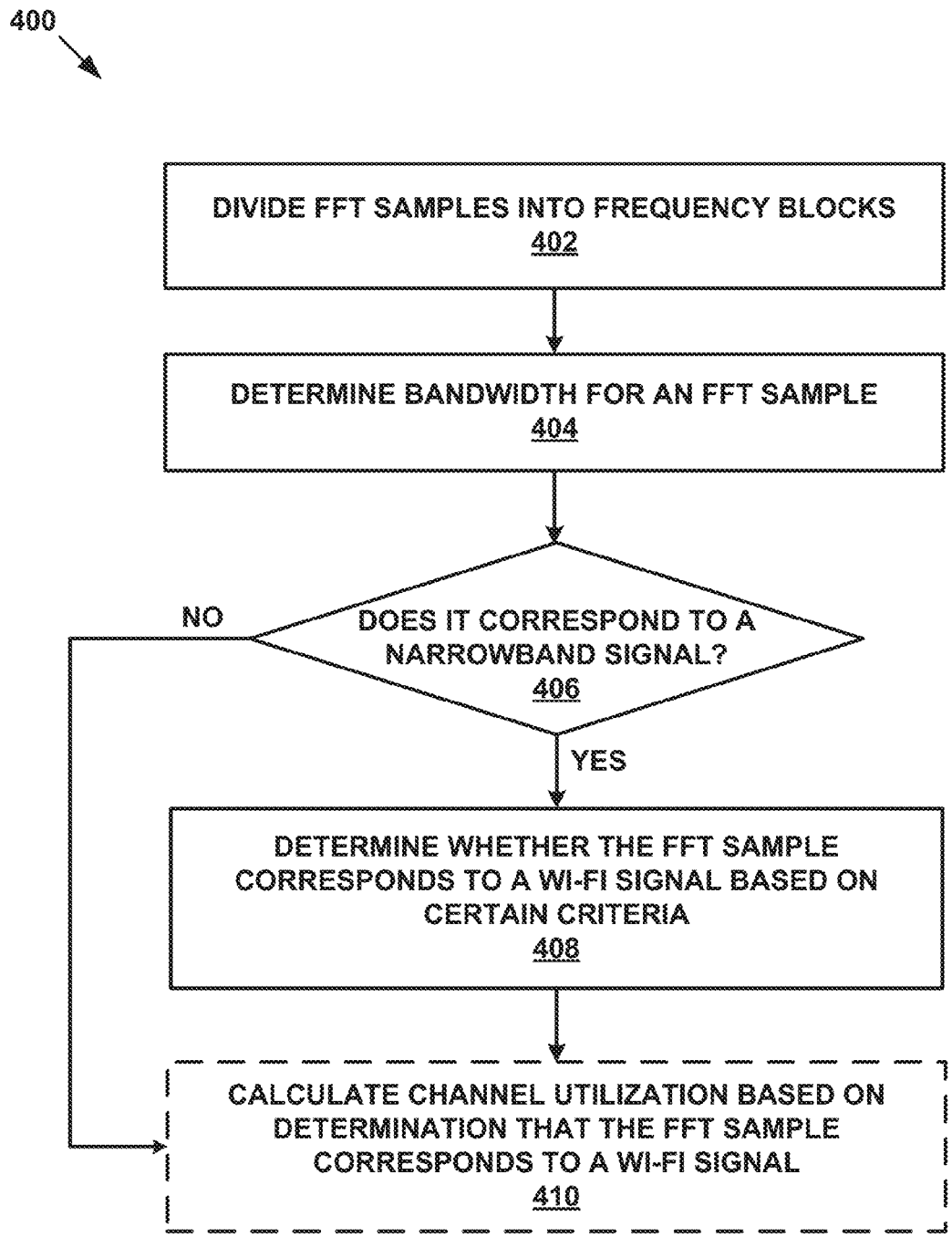
FIG. 4 illustrates an example process for detecting Wi-Fi signals from FFT samples according to embodiments of the present disclosure.

FIG. 4 illustrates an example process 400 for detecting Wi-Fi signals from FFT samples according to embodiments of the present disclosure. Process 400 begins with FFT samples being divided into frequency blocks (one or more operations indicated by block 402). Bandwidth is then determined for the FFT sample (one or more operations indicated by block 404). A determination is made as to whether the FFT sample corresponds to a narrowband signal (one or more operations indicated by decision block 406).

If it is determined that the FFT sample does not correspond to a narrowband signal (406-No), then channel utilization is calculated based on a determination that the FFT sample corresponds to a Wi-Fi signal (one or more operations indicated by block 410). If it is determined that the sample corresponds to a narrowband signal (406-Yes), a determination whether the FFT sample corresponds to a Wi-Fi signal is made based on certain criteria (one or more operations indicated by block 408). FIGS. 5, 6, 9, 10 and 11 illustrates example processes 408 for determining whether the FFT sample corresponds to a Wi-Fi signal based on various criteria. More details describing this example of process 408 will be described with regard to the descriptions of FIGS. 5, 6, 9, 10 and 11.

Figure 5:
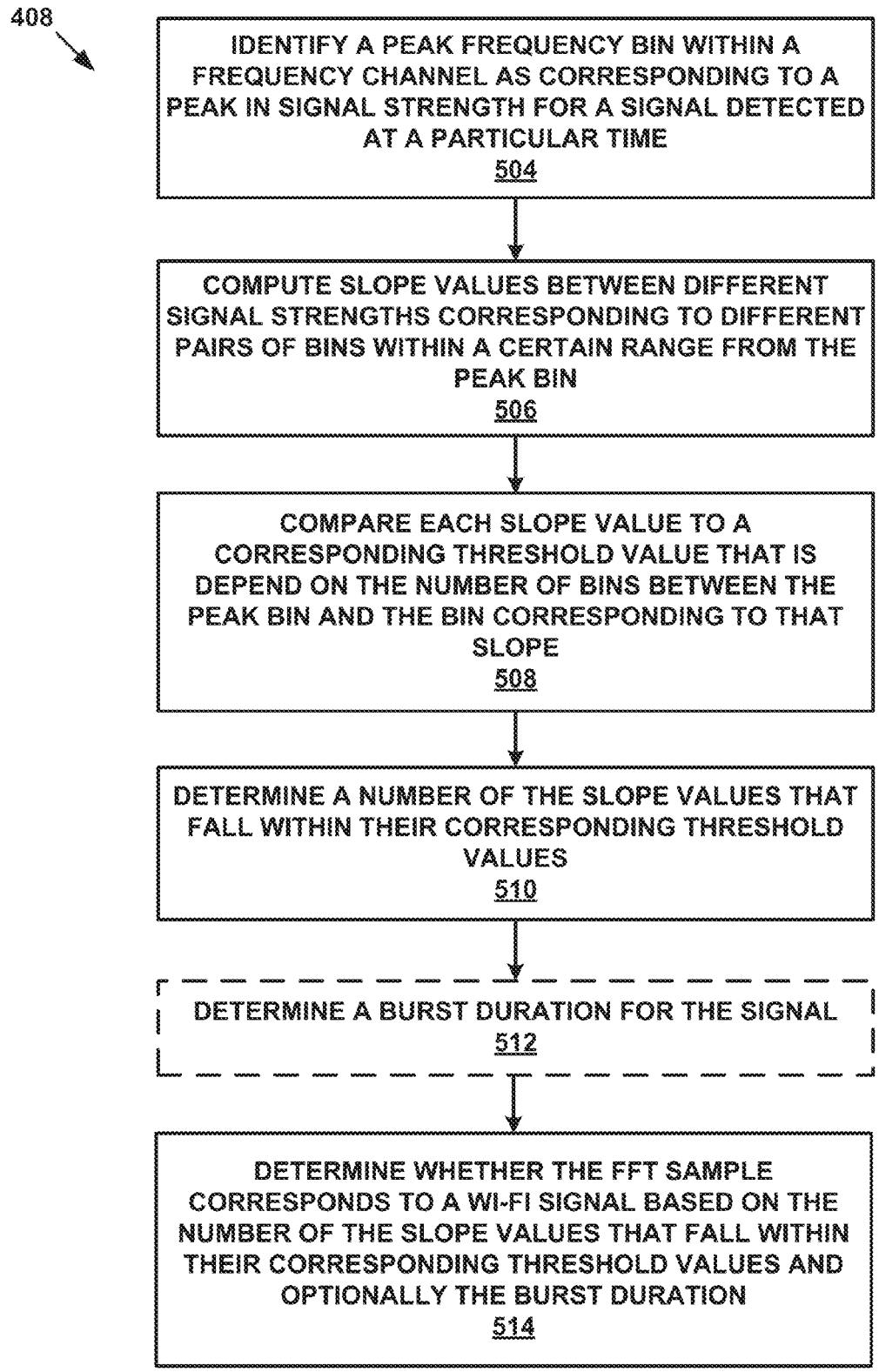
FIG. 5 illustrates an example process for detecting a Wi-Fi signal based on slope values according to embodiments of the present disclosure.

FIG. 5 illustrates an example process 408 for detecting a Wi-Fi signal. This process 408 as illustrated in FIG. 5 detects Wi-Fi signals based on slope values according to embodiments of the present disclosure. During operation, the process 408 as illustrated in FIG. 5 determines whether the FFT sample corresponds to a Wi-Fi signal based on the slope values. In some embodiments, the process 400 is performed by the slope calculation module 306. The process 400 begins when a peak frequency bin for an FFT sample is identified from a plurality of frequency bins corresponding to signal strength for a signal detected on a channel at a particular time (one or more operations indicated by block 504). In some embodiments, the peak frequency bin corresponds to a peak in signal strength. A set of slope values between the signal strength corresponding to the peak frequency bin and the signal strength for each of a plurality of frequency bins within a certain range from the peak frequency bin is then computed (one or more operations indicated by block 506). In some embodiments, this is performed by the slope calculation module 306. Each of the slope values is compared to a corresponding threshold value that is dependent on the number of the frequency bins between the peak frequency bin and the frequency bin corresponding to that slope (one or more operations indicated by block 508). A number of satisfying slope values is determined from the set of slope values (one or more operations indicated by block 510). In some embodiments, the satisfying slope values fall within their corresponding thresholds. Finally, determines whether the FFT sample corresponds to a Wi-Fi signal based at least on the number of satisfying slope values (one or more operations indicated by block 514).

In some embodiments, a burst duration for the signal is determined (one or more operations indicated by block 512). In such embodiments, determining whether the FFT sample corresponds to a Wi-Fi signal is also based on the burst duration.

Figure 6:
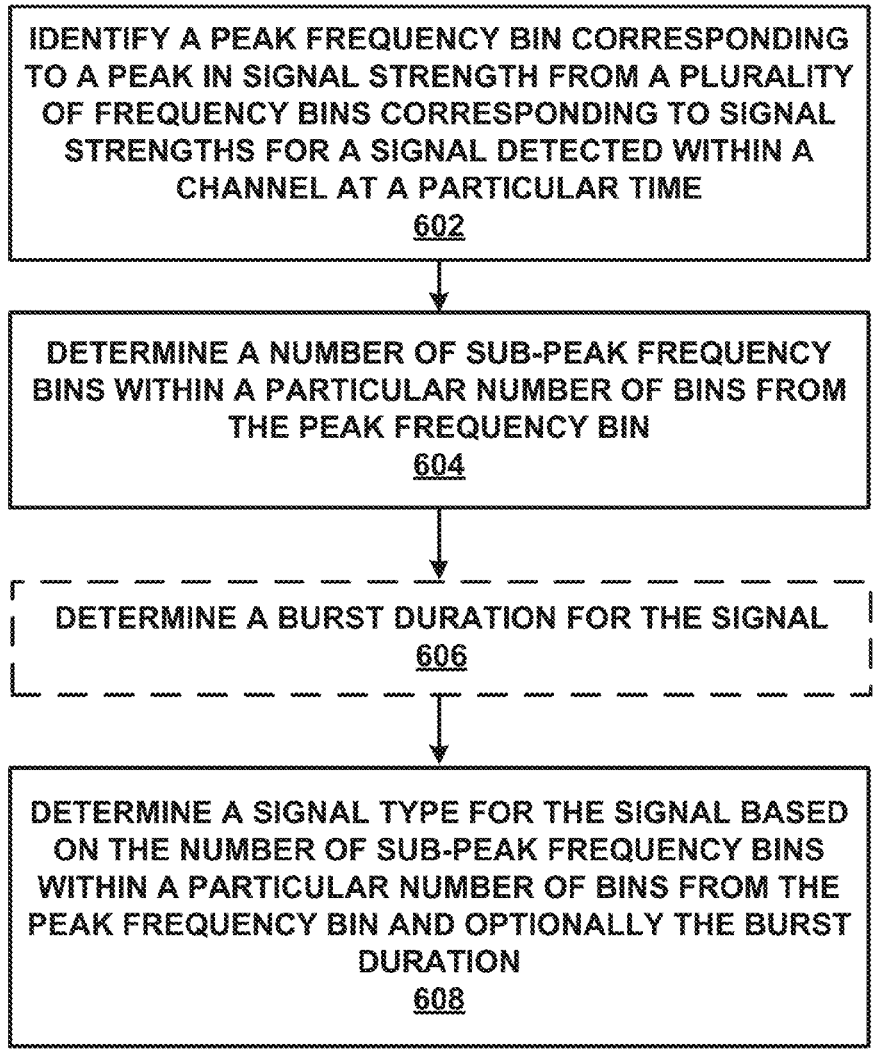
FIG. 6 illustrates an example process for determining signal type based on a number of sub-peak frequency bins according to embodiments of the present disclosure.

FIG. 6 illustrates an example process 408 for detecting a Wi-Fi signal and determining signal type. This process 408 as illustrated FIG. 6 in detects a Wi-Fi signal and determines signal type based on a number of sub-peak frequency bins according to embodiments of the present disclosure. In some embodiments, the sub-peak bin estimation module 308 performs the process 408, which determines a signal type for the signal based on the number of sub-peak frequency bins within the particular number of frequency bins from the peak frequency bin. The process 408 as illustrated FIG. 6 begins with a peak frequency bin being identified from a plurality of frequency bins for an FFT sample corresponding to signal strength for a signal detected within a frequency channel at a particular time (one or more operations indicated by block 602). In some embodiments, the peak frequency bin corresponds to a peak in the signal strength for the signal. A number of sub-peak frequency bins within a particular number of frequency bins from the peak frequency bin is determined (one or more operations indicated by block 604). Finally, a signal type for the signal based at least on the number of sub-peak frequency bins within the particular number of frequency bins from the peak frequency bin is determined (one or more operations indicated by block 608).

In some embodiments, a burst duration for the signal is also determined (one or more operations indicated by block 606). In such embodiments, determining the signal type for the signal is also based on the burst duration. In some embodiments, the signal type includes Wi-Fi signals as well as non-Wi-Fi signals.

A previously mentioned, in some embodiments, the sub-peak frequency bin is any frequency bin corresponding to a signal strengths that is (a) lower than the first signal strength, (b) higher than at least the signal strength for n consecutive frequency bins in the plurality of frequency bins preceding the particular bin, and (c) higher than at least the signal strength for m consecutive frequency bins in the plurality of frequency bins subsequent to the particular bin.

Figure 7A:
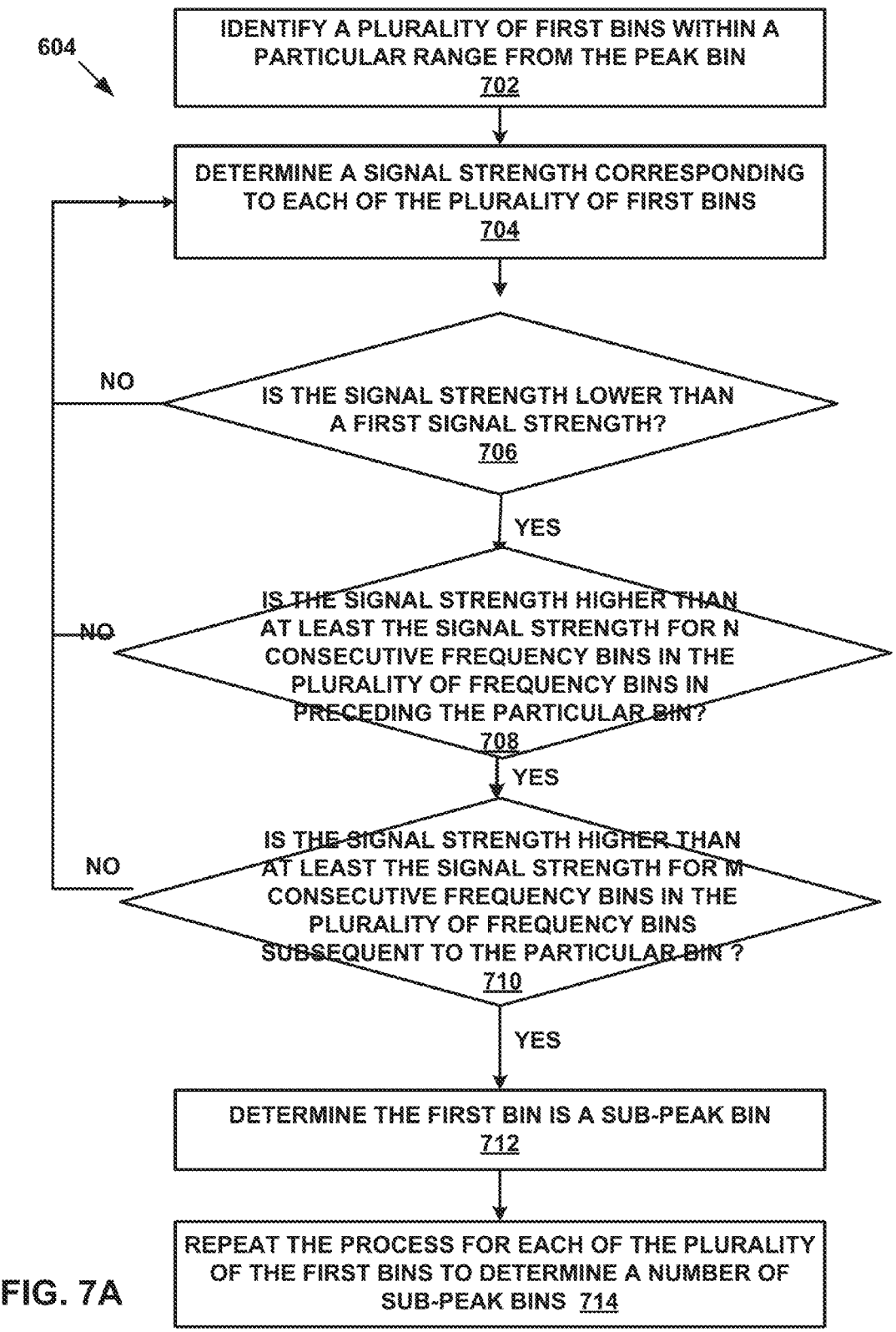
FIG. 7A illustrates an example process for determining a number of sub-peak bins according to embodiments of the present disclosure.
Figure 7B:
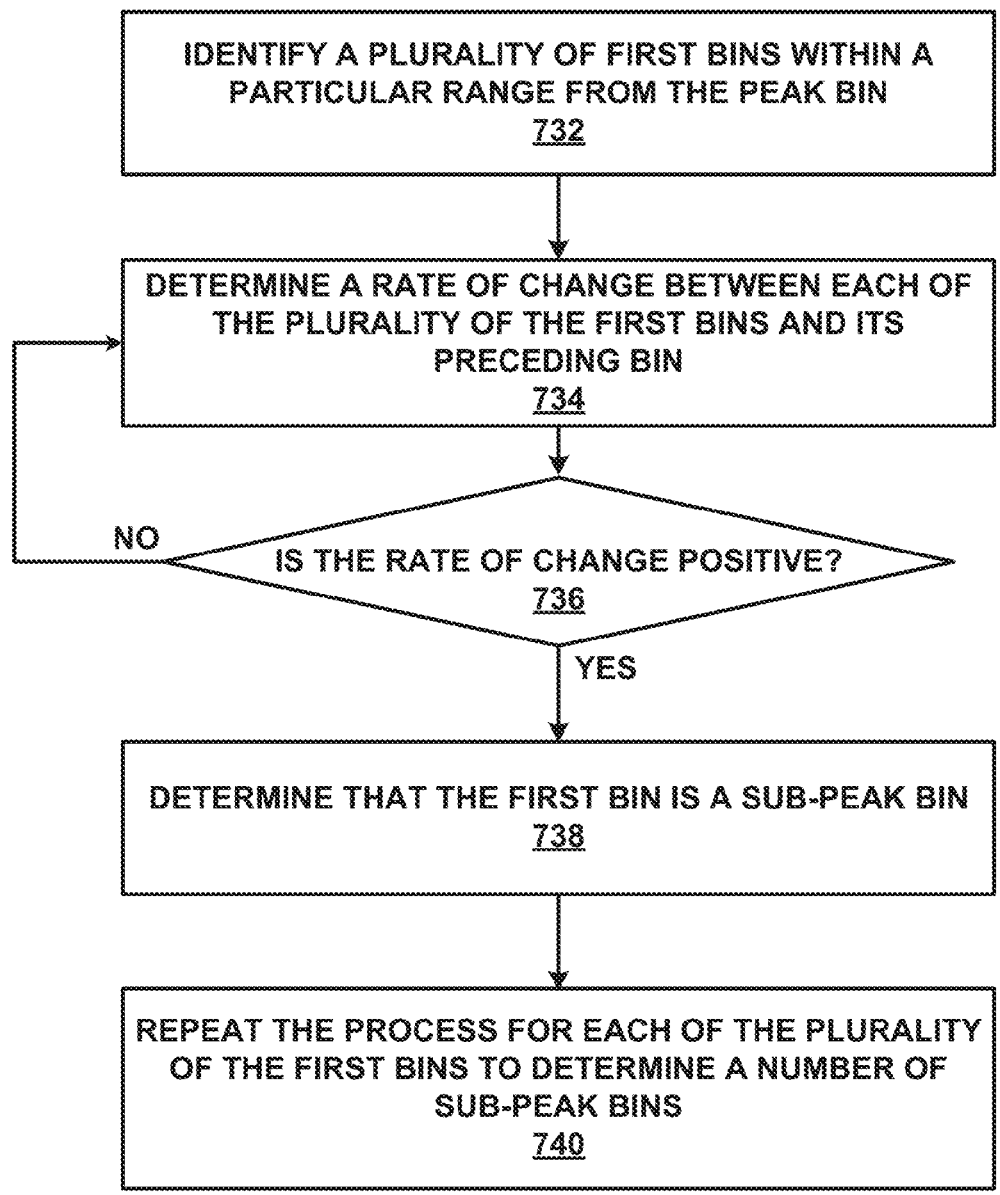
FIG. 7B illustrates an example process for a number of sub-peak bins according to other embodiments of the present disclosure.
Figure 7C:
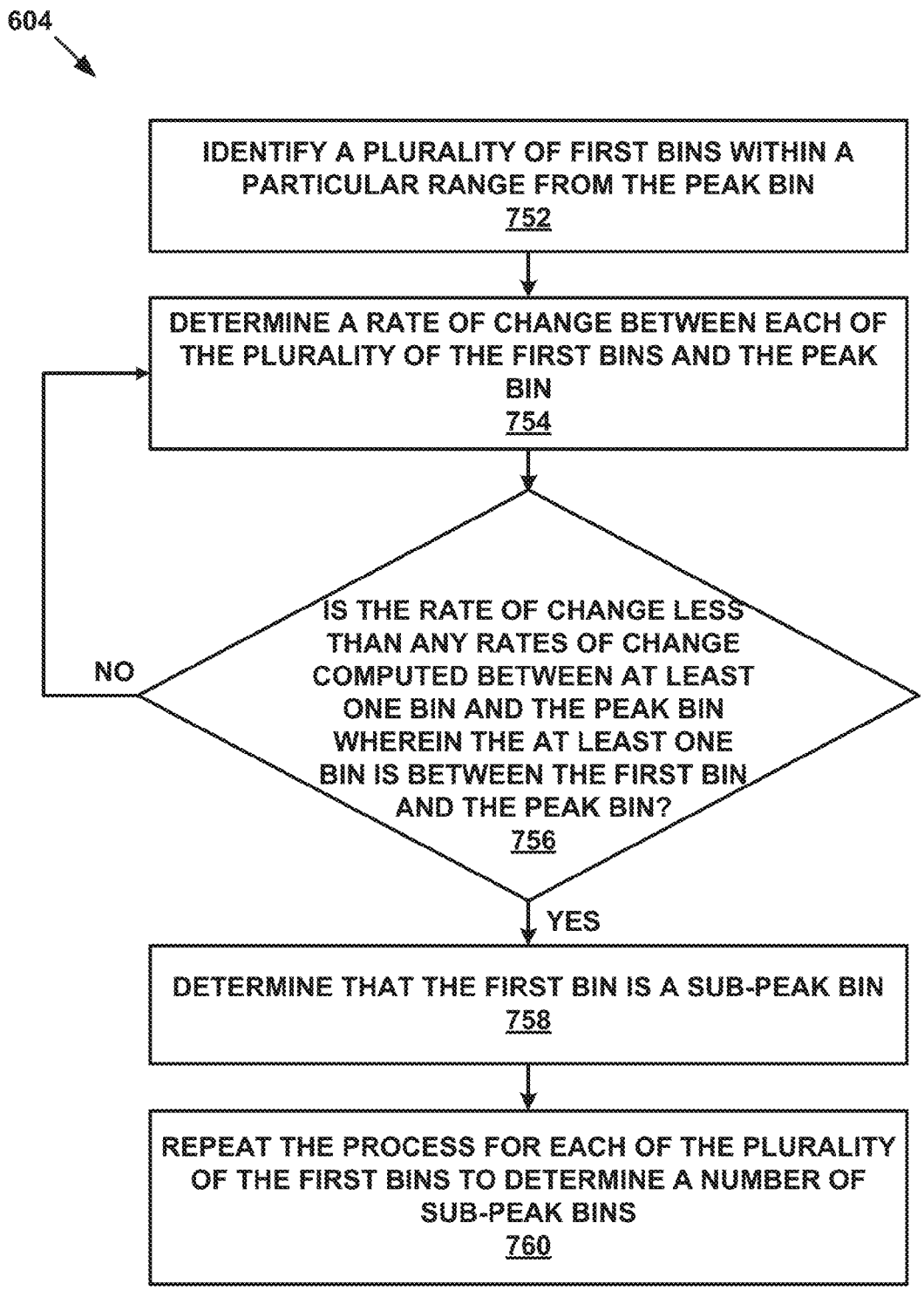
FIG. 7C illustrates an example process for a number of sub-peak bins according to yet other embodiments of the present disclosure.

Determining a number of sub-peak bins may be performed in various ways. FIGS. 7A-7C illustrate an example process 604 for determining a number of sub-peak bins according to embodiments of the present disclosure.

FIG. 7A illustrates an example process 604 for determining a number of sub-peak bins according to some embodiments of the present disclosure. The process 604 as illustrated in FIG. 7A begins as a plurality of frequency bins within a particular range from the peak bin is identified (one or more operations indicated by block 702). A signal strength corresponding to each of the plurality of frequency bins is determined (one or more operations indicated by block 704). A determination is made as to whether the signal strength is lower than a first signal strength (one or more operations indicated by decision block 706). If the signal strength is not lower than a first signal strength (706-No), the process 604 reverts to the one or more operations indicated by block 704. If the signal strength is lower than a first signal strength (706-Yes), then a determination is made as to whether the signal strength is higher than at least the signal strength for n consecutive frequency bins in the plurality of frequency bins preceding the particular bin (one or more operations indicated by decision block 708). If the signal strength is not higher than at least the signal strength for n consecutive frequency bins in the plurality of frequency bins preceding the particular bin (708-No), the process 604 reverts to the one or more operations indicated by block 704. If the signal strength is higher than at least the signal strength for n consecutive frequency bins in the plurality of frequency bins preceding the particular bin (708-Yes), then a determination is made as to whether higher than at least the signal strength for m consecutive frequency bins in the plurality of frequency bins subsequent to the particular bin (one or more operations indicated by decision block 710). If the signal strength is not higher than at least the signal strength for m consecutive frequency bins in the plurality of frequency bins subsequent to the particular bin (710-No), the process 604 reverts to the one or more operations indicated by block 704. If the signal strength is higher than at least the signal strength for m consecutive frequency bins in the plurality of frequency bins subsequent to the particular bin (710-Yes), a determination is made that the first bin is a sub-peak bin (one or more operations indicated by block 712). The process is then repeated for each of the plurality of the first bins to determine a number of sub-peak bins (one or more operations indicated by block 714).

FIG. 7B illustrates an example process 604 for a number of sub-peak bins according to other embodiments of the present disclosure. The process 604 as illustrated in FIG. 7B begins as a plurality of frequency bins within a particular range from the peak bin is identified (one or more operations indicated by block 732). A rate of change between each of the plurality of the frequency bins and its preceding bins is determined (one or more operations indicated by block 734). A determination is made as to whether the rate of change is positive (one or more operations indicated by decision block 736). If the rate of change is not positive (736-No), the process reverts to the one or more operations indicated by block 734. If the rate of change is positive (736-Yes), a determination is made that the first bin in the plurality of frequency bins is a sub-peak bin (one or more operations indicated by block 738). The process is then repeated for each of the plurality of the frequency bins to determine a number of sub-peak bins (one or more operations indicated by block 740).

FIG. 7C illustrates an example process for a number of sub-peak bins according to yet other embodiments of the present disclosure. The process 604 as illustrated in FIG. 7C begins as a plurality of frequency bins within a particular range from the peak bin is identified (one or more operations indicated by block 752). A rate of change between each of the plurality of the frequency bins and the peak bin is determined (one or more operations indicated by block 754). A determination is made as to whether the rate of change is less than any rates of change computed between at least one bin and the peak bin where the at least one bin is between the first bin and the peak bin (one or more operations indicated by block 756). If the rate of change is not less than any rates of change computed between at least one bin and the peak bin where the at least one bin is between the first bin and the peak bin (756-No), then the process reverts to the one or more operations indicated by block 754. If the rate of change is less than any rates of change computed between at least one bin and the peak bin where the at least one bin is between the first bin and the peak bin (756-Yes), then a determination is made that the first bin is a sub-peak bin (one or more operations indicated by block 758). The process is then repeated for each of the plurality of the first bins to determine a number of sub-peak bins (one or more operations indicated by block 760).

Figure 8:
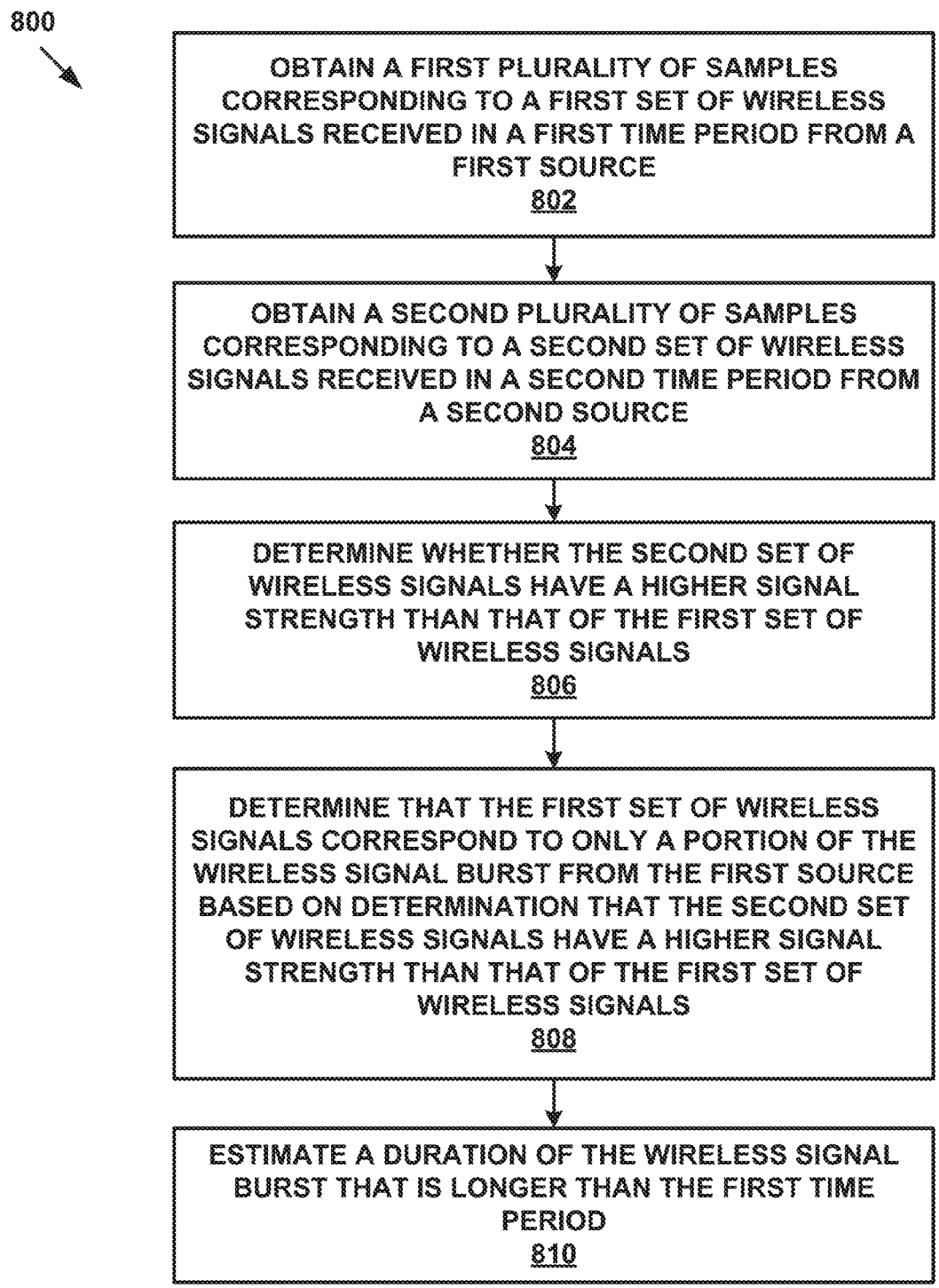
FIG. 8 illustrates an example process for estimating a burst size according to embodiments of the present disclosure.

FIG. 8 illustrates an example process 800 for estimating a burst size according to embodiments of the present disclosure. The process 800 begins as a first plurality of samples corresponding to a first set of wireless signals received in a first time period from a first source is obtained (one or more operations indicated by block 802). In some embodiments, the first set of wireless signals corresponding to a portion of a wireless signal burst from the first source. A second plurality of samples corresponding to a second set of wireless signals received in a second time period from a second source is obtained (one or more operations indicated by block 804). A determination is made as to whether the second set of wireless signals has a higher signal strength than the first set of wireless signals (one or more operations indicated by block 806). It is then determined that the first set of wireless signals corresponds to a portion of a wireless signal burst from the first source (one or more operations indicated by block 808). In some embodiments this determination is based on the determination that the second set of wireless signals has a higher signal strength than the first set of wireless signals. A duration of the wireless signal burst that is longer than the first time period is estimated (one or more operations indicated by block 810).

In some embodiments, determining that the second set of wireless signals have a higher signal strength than the first set of wireless signals includes: computing a first average signal strength for the first set of wireless signals; computing a second average signal strength for the second set of wireless signals and comparing the first average signal strength and the second average signal strength.

Figure 9:
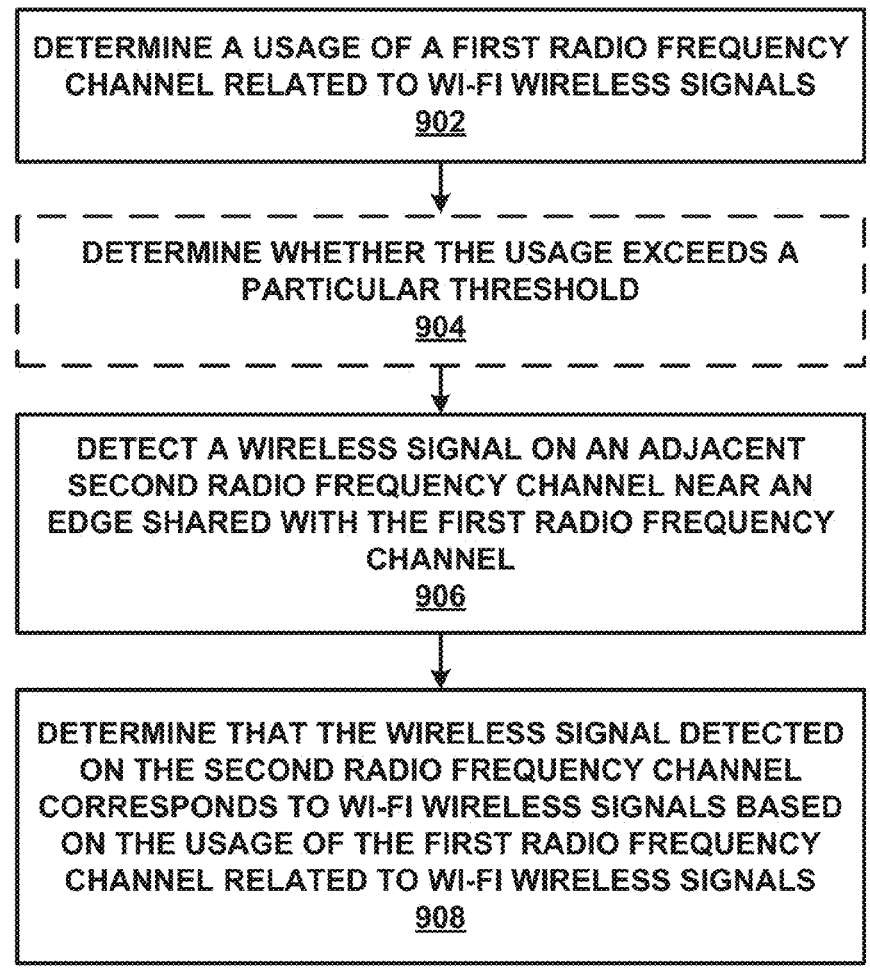
FIG. 9 illustrates an example process for detecting Wi-Fi signals based on estimation for adjacent channels according to embodiments of the present disclosure.

FIG. 9 illustrates an example process 408 for detecting Wi-Fi signals based on estimation for adjacent channels according to embodiments of the present disclosure. The process 408 as illustrated in FIG. 9 begins as a usage of a first radio frequency channel related to Wi-Fi wireless signals is determined (one or more operations indicated by block 902). Note that, usage of a radio frequency channel generally refers to one or more of channel utilization and/or duty cycle. Optionally, in some embodiments, whether the usage of the first radio frequency channel exceeds a particular threshold is determined (one or more operations indicated by block 904). A wireless signal on a second radio frequency channel adjacent to the first radio frequency channel is detected (one or more operations indicated by block 906). In some embodiments, the wireless signal being is an edge of the second radio frequency channel shared with the first radio frequency channel. A determination is made that wireless signal detected on the second radio frequency channel corresponds to Wi-Fi wireless signals based at least on the usage of the first radio frequency channel related to Wi-Fi wireless signals (one or more operations indicated by block 908).

Figure 10:
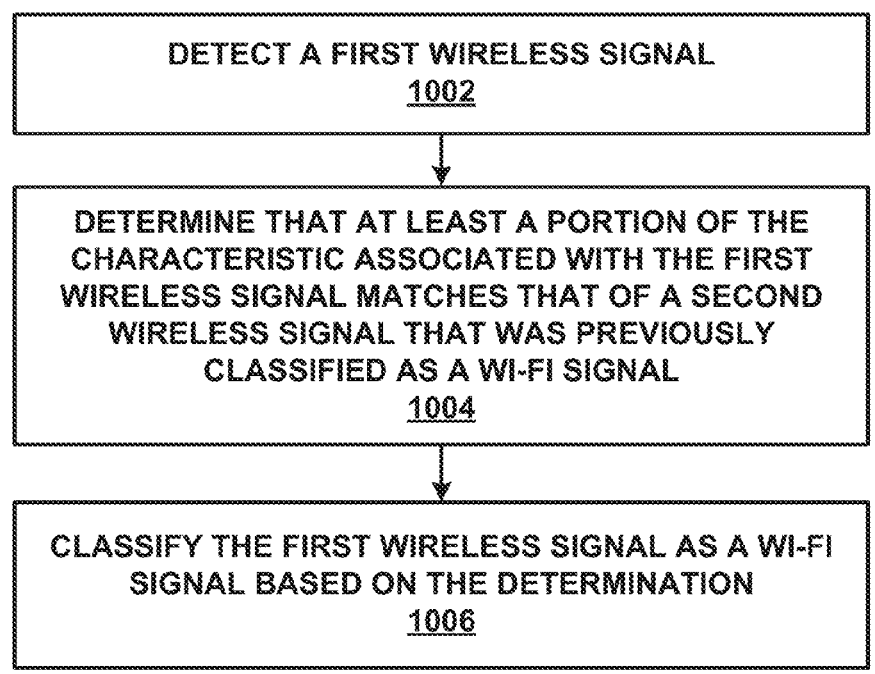
FIG. 10 illustrates an example process for classifying Wi-Fi signals based on characteristic matching according to embodiments of the present disclosure.

FIG. 10 illustrates an example process 408 for classifying Wi-Fi signals based on characteristic matching according to embodiments of the present disclosure. The process 408 as illustrated in FIG. 10 begins as a first wireless signal is detected (one or more operations indicated by block 1002). A determination is made that at least a portion of the characteristics associated with the first wireless signal matches that of a second wireless signal that was previously classified as a Wi-Fi signal (one or more operations indicated by block 1004). The first wireless signal is classified as a Wi-Fi signal based at least on the determination that at least a portion of the characteristics associated with the first wireless signal matches the second wireless signal (one or more operations indicated by block 1006).

Figure 11:
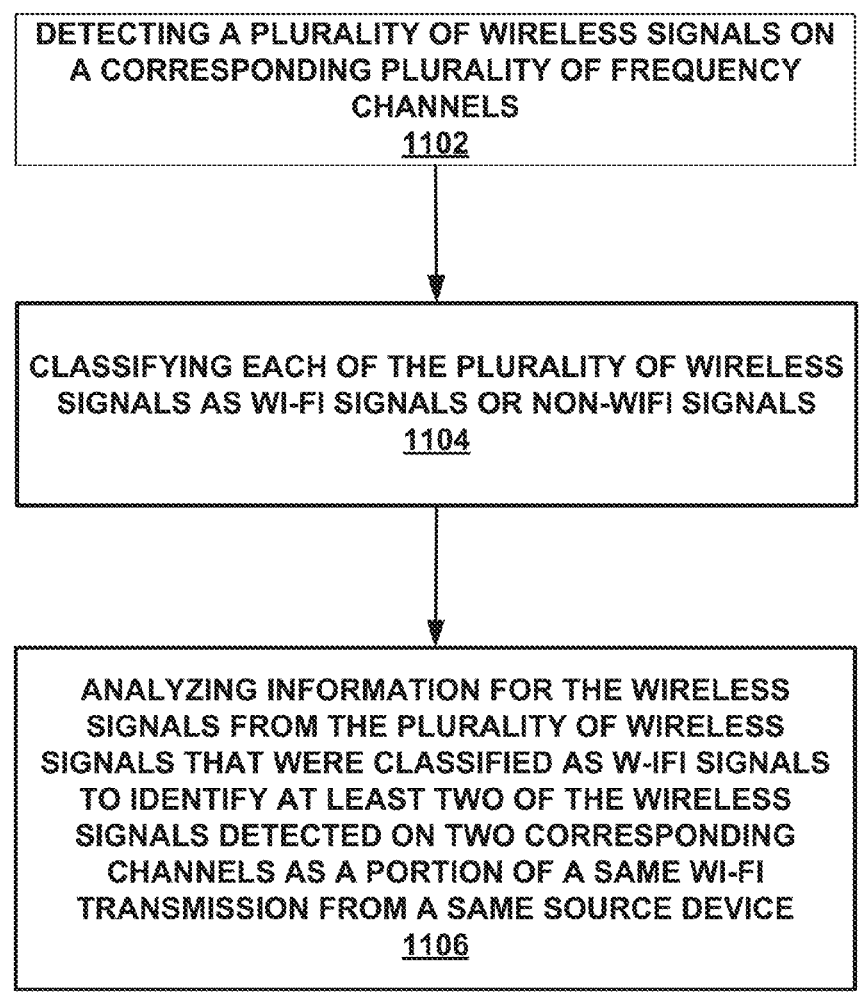
FIG. 11 illustrates an example process for classifying Wi-Fi signals according to other embodiments of the present disclosure.

FIG. 11 illustrates an example process 408 for classifying Wi-Fi signals according to other embodiments of the present disclosure. The process 408 as illustrated in FIG. 11 begins as a plurality of wireless signals on a corresponding plurality of frequency channels is detected (one or more operations indicated by block 1102). Each of the plurality of wireless signals is classified as Wi-Fi signals or non-Wi-Fi signals (one or more operations indicated by block 1104). Information for the wireless signals from the plurality of wireless signals that were classified as Wi-Fi signals is analyzed to identify at least two of the wireless signals detected on two corresponding channels as a portion of a same Wi-Fi transmission from a same source device (one or more operations indicated by block 1106). In some embodiments, a channel width of each of the plurality of frequency channels is 20 Mhz. In some embodiments, identifying at least two of the wireless signals as a portion of the same Wi-Fi transmission includes determining that the at least two wireless signals are detected with a same signal strength range. In some embodiments, identifying at least two of the wireless signals as a portion of the same WiFi transmission includes determining that the at least two wireless signals are detected within a same time period.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are example and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
   determining, for each of a plurality of frequency bins in a Fourier Transform sample, a corresponding signal strength, the Fourier Transform sample corresponding to a wireless signal as detected at a first time period;
   identifying a first frequency bin, from the plurality of frequency bins, with a first signal strength, the first signal strength being a highest signal strength in the signal strengths corresponding to each of the plurality of frequency bins;
   determining a decrease in signal strength between (a) the first signal strength corresponding to the first bin and (b) a second signal strength corresponding to a second bin in the plurality of bins; and
   classifying the Fourier Transform sample based
      at least on the decrease in signal strength and a frequency difference between the first bin and the second bin, and
      on an average difference between sets of signal strengths corresponding to bins in the plurality of frequency bins.

2. The medium of claim 1, wherein classifying the Fourier Transform sample further comprises classifying the Fourier Transform sample as corresponding to one of a Wi-Fi signal or a non-Wi-Fi signal.

3. The medium of claim 1, wherein classifying the Fourier Transform sample further comprises classifying the Fourier Transform sample based on a burst duration exceeding a predetermined threshold value, wherein the wireless signal is detected during the burst duration.

4. The medium of claim 1, wherein classifying the Fourier Transform sample further comprises:
   for each set in a plurality of sets of frequency bins:
      identifying a signal strength difference and a frequency difference;
      computing a slope value based on the signal strength difference and the frequency difference;
      determining if the slope value meets a corresponding threshold value;
   identifying a number of sets in the plurality of sets of frequency bins for which the computed slope value meets the corresponding threshold value;
   classifying the Fourier Transform based on the number of sets in the plurality of sets of frequency bins for which the computed slope value meets the corresponding threshold value.

5. The medium of claim 1, wherein classifying the Fourier Transform sample is further based on one or more difference values, a difference value being computed by comparing (a) a signal strength corresponding to a particular frequency bin in the plurality of frequency bins with (b) an average of signal strength values for two or more frequency bins other than the particular frequency bin.

6. The medium of claim 5, wherein the two or more frequency bins comprise a first number of frequency bins preceding the particular frequency bin and a second number of frequency bins following the particular frequency bin, wherein the first number and the second number are equal.

7. A non-transitory computer readable medium comprising instructions which, when executed by one or more hardware processors, causes performance of operations comprising:
   determining, for each of a plurality of frequency bins in a Fourier Transform sample, a corresponding signal strength, the Fourier Transform sample corresponding to a wireless signal as detected at a first time period;
   identifying a first frequency bin, from the plurality of frequency bins, with a first signal strength, the first signal strength being a highest signal strength in the signal strengths corresponding to each of the plurality of frequency bins;
   identifying a subset of the plurality of frequency bins, each particular bin in the subset of frequency bins corresponding to signal strengths that is (a) lower than the first signal strength, (b) higher than at least the signal strength for n consecutive frequency bins in the plurality of frequency bins preceding the particular bin, and (c) higher than at least the signal strength for m consecutive frequency bins in the plurality of frequency bins subsequent to the particular bin, wherein n and m are positive integers greater than or equal to two; and based on a number of frequency bins in the subset of frequency bins, classifying the Fourier Transform sample.

8. The medium of claim 7, wherein classifying the Fourier Transform sample comprises classifying the Fourier Transform sample as corresponding to one of a Wi-Fi signal or a non-Wi-Fi signal.

9. The medium of claim 7, wherein the operations further comprise classifying the Fourier Transform sample based on a burst duration during which the wireless signal is detected.

10. The medium of claim 7, wherein the classifying operation is based on whether the number of frequency bins in the subset of frequency bins exceeds a threshold number.

11. The medium of claim 7, wherein n is different than m.

12. The medium of claim 7, wherein n is same as m.

13. The medium of claim 7, wherein the subset of plurality of frequency bins is further defined to include one of: (a) bins that are subsequent to the first bin or (b) bins that are preceding the first bin.

14. A non-transitory computer readable medium comprising instructions which, when executed by one or more hardware processors, causes performance of operations comprising:

detecting a plurality of wireless signals on a corresponding plurality of frequency channels;

classifying each of the plurality of wireless signals as Wi-Fi signals or non-Wi-Fi signals based on a burst duration exceeding a predetermined threshold value, wherein a wireless signal of the plurality of wireless signals is detected during the burst duration, or an average difference between sets of signal strengths corresponding to bins in frequency bins in a sample corresponding to the wireless signal of the plurality of wireless signals;

and analyzing information for the wireless signals from the plurality of wireless signals that were classified as Wi-Fi signals to identify at least two of the wireless signals detected on two corresponding channels as a portion of a same Wi-Fi transmission from a same source device.

15. The medium of claim 14, wherein a channel width of each of the plurality of frequency channels is 20 Mhz.

16. The medium of claim 14, wherein identifying at least two of the wireless signals as a portion of the same Wi-Fi transmission comprises:

determining that the at least two wireless signals are detected with a same signal strength range.

17. The medium of claim 14, wherein identifying at least two of the wireless signals as a portion of the same Wi-Fi transmission comprises:

determining that the at least two wireless signals are detected within a same time period.

* * * * *